(No Model.)

H. H. LUSCOMB.
MECHANICAL CLIP.

No. 584,383. Patented June 15, 1897.

Witnesses:
E. J. Hyde.
C. E. Buckland.

Inventor:
Henry H. Luscomb
by Harry R. Williams
atty.

UNITED STATES PATENT OFFICE.

HENRY H. LUSCOMB, OF HARTFORD, CONNECTICUT, ASSIGNOR TO THE JOHNS-PRATT COMPANY, OF SAME PLACE.

MECHANICAL CLIP.

SPECIFICATION forming part of Letters Patent No. 584,383, dated June 15, 1897.

Application filed November 18, 1896. Serial No. 612,578. (No model.)

*To all whom it may concern:*

Be it known that I, HENRY H. LUSCOMB, a citizen of the United States, residing at Hartford, in the county of Hartford and State of Connecticut, have invented certain new and useful Improvements in Mechanical Clips, of which the following is a specification.

The invention relates to those clips which are more particularly adapted and designed for grasping trolley and similar wires and connecting them to the supporting-insulators or insulators that are held by the span or other supporting wires without soldering or brazing.

The object of the invention is to provide a clip for this purpose which is inexpensive to manufacture, simple to place in position, easy to remove from position, and which can be manipulated by any one, so that it will hold the wire very securely.

Figure 1:
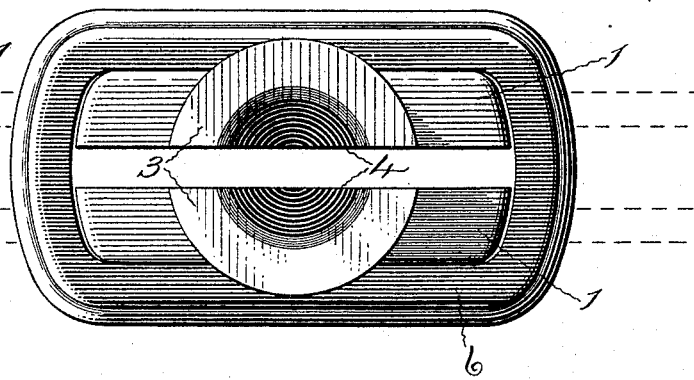
Figure 2:
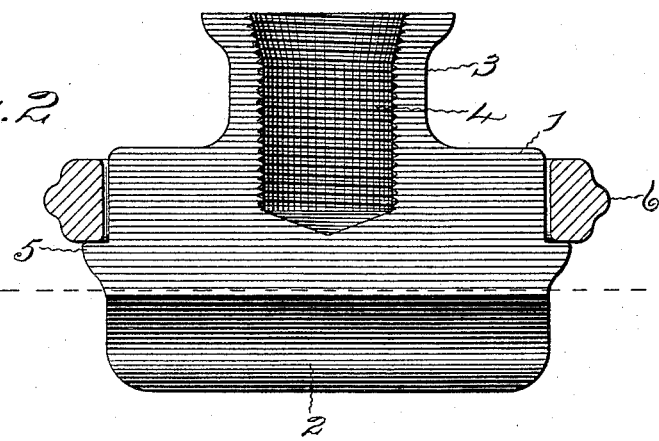
Figure 3:
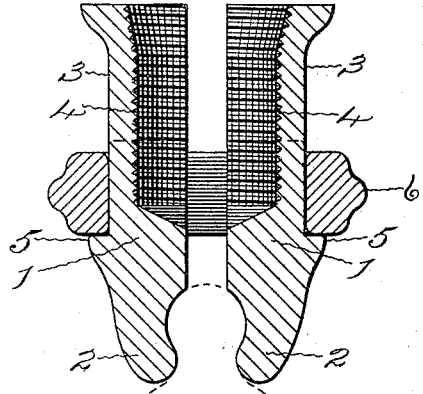

On the accompanying sheet of drawings, Figure 1 shows a plan view of a clip which embodies the invention. Fig. 2 shows a central vertical longitudinal section, and Fig. 3 shows a central vertical transverse section of the same.

The clip illustrated is more particularly designed for holding a so-called "8-shaped" trolley-wire, and such a wire is indicated by the dotted lines.

This clip is formed of two similar parts, each of which has an oblong body-section 1, a curved grasping-jaw 2, and a shank 3 with a threaded recess 4 in one face. Each part is preferably provided on the outside face with a shoulder 5. When the two parts are placed face to face, the jaws form a cylindrical grasping-recess between them, and the two shanks together form the stem of the clip, while the recesses in the shanks form a threaded stud or bolt socket. When these parts are located in this manner, a ring, band, or link 6 is placed about the body-sections, so as to rest upon the shoulders 5 and prevent the two parts from being separated. The two parts may be brought close together in order to slip the ring, band, or link over the end of the stem of the clip, if this stem is provided with an enlarged head, as shown in the drawings. When the parts are assembled, the shanks may be pressed together, so as to allow the jaws to be moved from each other. When the jaws are open, a trolley or other wire may be placed between them, and then when a stud of any common insulator that is threaded so it will fit is screwed into the socket the shanks of the body parts will be forced from each other and the jaws closed and made to bite very securely upon the wire between them. The upper portions of the threaded recesses in the shanks are preferably made a little tapering, so the stud of the insulator may be easily started when the jaws are open and the shank parts are together, and then the stud is also preferably made with a tapering thread, so that when it is screwed home the shanks will be strongly forced apart and the jaws closed to very securely bite the wire.

The ends of the jaws shown are somewhat thick, and are rounded off to fit within the curve of an 8-shaped trolley-wire; but of course if the clip is intended to grasp and hold an ordinary round wire the jaws may be formed more tapering, so as to partially encircle the wire without offering any obstruction to the passage of the trolley-wheel, as are the jaws of prior mechanical clips.

The ring, band, or link and the body parts with the jaws and recessed shanks can be cheaply cast or stamped to shape of sufficiently-strong metal and the parts can be assembled and closed upon a wire by any one, so that when the stud of any ordinary insulator is screwed into the threaded socket the wire will be very tightly held between the jaws. By removing the insulator-stud from the socket these jaws can be loosened and the wire removed at any desired time.

With this clip a wire can be held very securely without soldering or brazing.

I claim as my invention—

1. A mechanical clip consisting of two separable body parts each having a curved jaw and a recessed shank, and a link with a smooth interior face loosely encircling the body parts between the recessed shanks and the jaws for holding the body parts together, substantially as specified.

2. A mechanical clip consisting of two similar body parts each having a curved jaw and a shank with a semicircular recess in one face, said recesses being provided with screw-threads, and a link loosely encircling the body parts and holding them from separation, substantially as specified.

3. A mechanical clip consisting of two similar body parts each having a curved jaw an outwardly-projecting shoulder and a shank with a threaded recess, and an encircling link for holding the parts together, substantially as specified.

4. A mechanical clip consisting of two similar body parts each having a curved jaw and a shank with a threaded recess said parts being loosely held together near their middle so that when a stem is screwed into the socket formed by the threaded recesses the jaws will be closed toward each other, substantially as specified.

HENRY H. LUSCOMB.

Witnesses:
H. R. WILLIAMS,
E. J. HYDE.